(12) United States Patent
Xiang et al.

(10) Patent No.: US 10,429,571 B1
(45) Date of Patent: Oct. 1, 2019

(54) BACKLIGHT MODULE AND DISPLAY DEVICE

(71) Applicants: Beijing BOE Optoelectronics Technology Co., Ltd., Beijing (CN); BOE TECHNOLOGY GROUP CO., LTD., Beijing (CN)

(72) Inventors: Desheng Xiang, Beijing (CN); Yanming Wang, Beijing (CN); Jiaqiang Wang, Beijing (CN); Dawei Wang, Beijing (CN); Rui Liu, Beijing (CN); Sa Li, Beijing (CN); Xi Chen, Beijing (CN); Yajun Guo, Beijing (CN); Yafeng Wang, Beijing (CN); Jianwu Wu, Beijing (CN)

(73) Assignees: Beijing BOE Optoelectronics Technology Co., Ltd., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/118,238

(22) Filed: Aug. 30, 2018

(30) Foreign Application Priority Data

Mar. 23, 2018 (CN) .......................... 2018 1 0247941

(51) Int. Cl.
*F21V 7/04* (2006.01)
*F21V 8/00* (2006.01)

(52) U.S. Cl.
CPC .......... *G02B 6/005* (2013.01); *G02B 6/0051* (2013.01); *G02B 6/0053* (2013.01); *G02B 6/0083* (2013.01)

(58) Field of Classification Search
None
See application file for complete search history.

(56) References Cited

FOREIGN PATENT DOCUMENTS

| CN | 202915279 U | 5/2013 |
| CN | 202955582 U | 5/2013 |
| CN | 105044961 A | 11/2015 |
| CN | 105527748 A | 4/2016 |
| CN | 205210477 U | 5/2016 |
| CN | 205301760 U | 6/2016 |
| CN | 105733465 A | 7/2016 |
| CN | 205480513 U | 8/2016 |
| CN | 106773295 A | 5/2017 |
| CN | 107272262 A | 10/2017 |

OTHER PUBLICATIONS

Chinese Office Action dated Jun. 24, 2019, from application No. 201810247941.3.

*Primary Examiner* — Vip Patel
(74) *Attorney, Agent, or Firm* — Foley & Lardener LLP

(57) ABSTRACT

The present disclosure relates to a backlight module. The backlight module includes a back plate, a circuit layer, a light source and a plurality of connecting leads. The back plate has a first surface and a second surface which are opposite to each other, wherein the back plate is provided with a plurality of through holes penetrating the first surface and the second surface. The circuit layer is disposed on the first surface to form a driving circuit for a light source. The light source is disposed on a surface of the circuit layer away from the back plate and formed integrally with the back plate. The plurality of connecting leads pass through the plurality of through holes one-to-one for connecting circuit layer and a main circuit board.

14 Claims, 10 Drawing Sheets

BACKLIGHT MODULE AND DISPLAY DEVICE

CROSS-REFERENCE TO RELATED APPLICATIONS

This application claims priority to Chinese Patent Application 201810247941.3, filed Mar. 23, 2018, the entire contents of which are incorporated herein by reference.

TECHNICAL FIELD

The present disclosure relates to display technologies, and particularly to a backlight module and a display device provided with the backlight module.

BACKGROUND

With the rapid development of electronic technologies, people's requirements on electronic products have been increased. Taking smart phones as an example, the narrow bezel design of the phone screen can make product more fashionable, and can also increase the screen-to-body ratio of the screen to some extent to make the displayed pictures wider, thus meeting the increasing consumer demand for display products.

SUMMARY

Arrangements of the present disclosure provide a backlight module which is not easy to fall off (or peel off) and a display device having the backlight module disposed thereof.

The additional aspects and advantages of the present disclosure will be set forth in part in the description which follows, and will become apparent from the following descriptions, or can be learned from the practice of the present disclosure.

According to an aspect of arrangements of the present disclosure, there is provided a backlight module. The backlight module includes
a back plate having a first surface and a second surface which are opposite to each other. The back plate is provided with a plurality of through holes penetrating the first surface and the second surface. The backlight module includes
a circuit layer disposed on the first surface to form a driving circuit for a light source. The backlight module includes
the light source disposed on a surface of the circuit layer away from the back plate and formed integrally with the back plate. The backlight module includes a plurality of connecting leads passing through the plurality of through holes one-to-one for connecting the circuit layer and a main circuit board.

In an exemplary arrangement of the present disclosure, the backlight module further includes:
a light guide plate adhered to the back plate and located on a light exit side of the light source;
a backlight film disposed on a side of the light guide plate away from the back plate; and a light shielding tape for fixing the backlight film on a side where the light source is disposed.
The backlight film includes:
a diffusion sheet disposed on a side of the light guide plate away from the back plate; a lower prism sheet disposed on a side of the diffusion sheet away from the back plate; and an upper prism sheet disposed on a side of the lower prism sheet away from the back plate.

In an exemplary arrangement of the present disclosure, on a side where the light source is disposed, the light guide plate protrudes from the diffusion sheet, and the light shielding tape is adhered to a side of the light guide plate away from the back plate and a side of the diffusion sheet away from the back plate.

In an exemplary arrangement of the present disclosure, the diffusion sheet includes:
a first sheet adhered to the light shielding tape; and
a notch provided on a side of the first sheet close to the light source.

In an exemplary arrangement of the present disclosure, the lower prism sheet is adhered to a side of the light shielding tape away from the back plate, and the lower prism sheet includes:
a second sheet; and
a lug disposed on a side of the second sheet close to the light source and engaging with the notch, the lug being adhered to the light shielding tape.
The upper prism sheet is adhered to a position where the light shielding tape is not adhered to the lower prism sheet.

According to another aspect of arrangements of the present disclosure, there is provided a display device, including:
a display panel;
a cover plate disposed on a side of the display panel; and
a backlight module, disposed on a side of the display panel away from the cover plate. A back plate includes:
a back plate body; and
a first bending structure connected to the back plate body.

In an exemplary arrangement of the present disclosure, on a side where a light source is disposed, the back plate further includes a second bending structure connected to the first bending structure and extending in a direction which is the same as that of the back plate body.
The display device further includes: a first adhesive portion for adhering the second bending structure and the cover plate.

In an exemplary arrangement of the present disclosure, on a side opposite to a side where a light source is disposed, the back plate further includes: a third bending structure connected to the first bending structure and extending in a direction that is the same as that of the back plate body.
The display panel is lapped on the third bending structure.

In an exemplary arrangement of the present disclosure, the back plate further includes a fourth bending structure connected to the third bending structure and forming a preset angle with respect to the third bending structure.
The display device further includes:
a second adhesive portion for adhering the third bending structure, the fourth bending structure, the display panel, and the cover.

In an exemplary arrangement of the present disclosure, except the side on which the light source is disposed and the opposite side of the light source, the display device further includes:
a light shielding adhesive layer for adhering the first bending structure and the display panel.

BRIEF DESCRIPTION OF THE DRAWINGS

The above and other features and advantages of the present disclosure will become more apparent from the detailed description of the exemplary arrangements.

DETAILED DESCRIPTION

Figure 1:
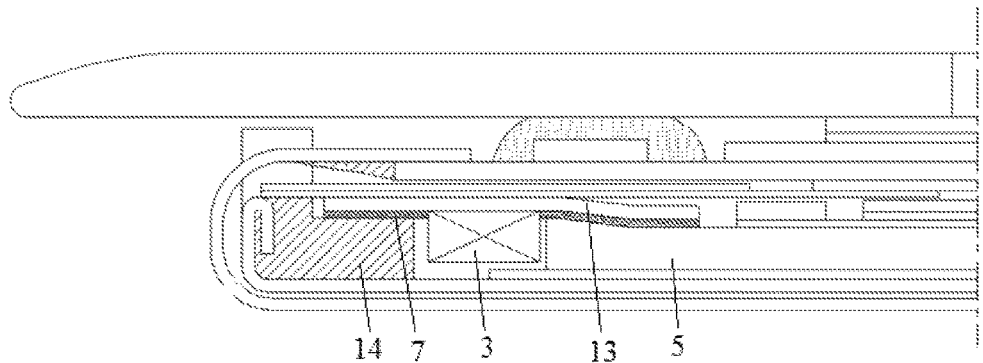
FIG. 1 is a schematic view of a partial structure (the light source side) of a backlight module in the prior art.

Exemplary arrangements will now be described more fully with reference to the accompanying drawings. However, the exemplary arrangements can be embodied in a variety of forms and should not be construed as being limited to the arrangements set forth herein. The arrangements of the present disclosure are provided to make the present disclosure more fully and completely understood and to convey the concept of the present disclosure to those skilled in this art. The same reference numerals in the drawings denote the same or similar structures, and thus their detailed description will be omitted.

Figure 2:
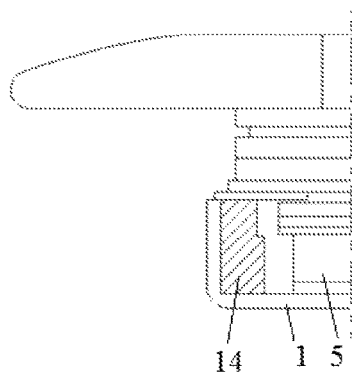
FIG. 2 is a schematic view of a partial structure (the side opposite to the light source) of a backlight module in the prior art.
Figure 3:
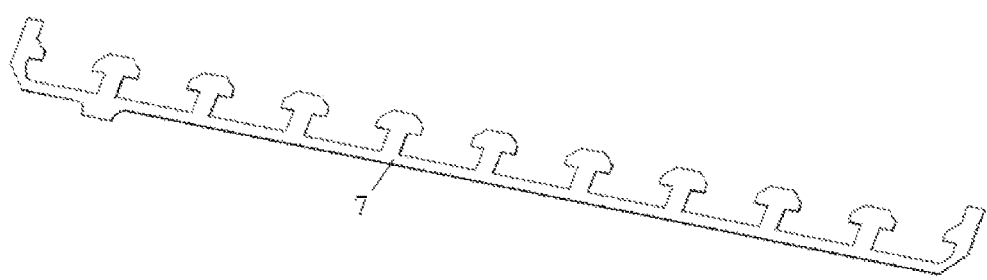
FIG. 3 is a schematic structural view of the tape of FIG. 1.

FIG. 1 is a schematic view of a partial structure (the light source side) of a backlight module in the prior art. FIG. 2 is a schematic view of a partial structure (the side opposite to the light source) of a backlight module in the prior art. FIG. 3 is a schematic structural view of the tape of FIG. 1. On the light source side, a circuit board 13 of a light-emitting diode (LED) strip (the light source 3) is fixed on a frame 14 and a light guide plate 5 through a light shielding tape 7. In order to ensure the light effect of the LED, the light shielding tape 7 is designed to be "open" (like a window), the adhesive area of the LED strip and the light guide plate 5 is reduced, and the adhesive strength is lowered. The adhesive strength can be increased by increasing the adhesive length of the LED strip and the light guide plate 5. But, this will increase the width of the backlight module, which is not conducive to narrowing the bezel of the backlight module. Since the adhesive strength between the LED strip and the light guide plate 5 is low, in the single cell reliability test of the backlight module, such as a roller or drop test, the LED strip and the light guide plate are separated, resulting in hot spot.

Therefore, it is necessary to develop a backlight module and a display device in which the backlight module is mounted.

Figure 4:
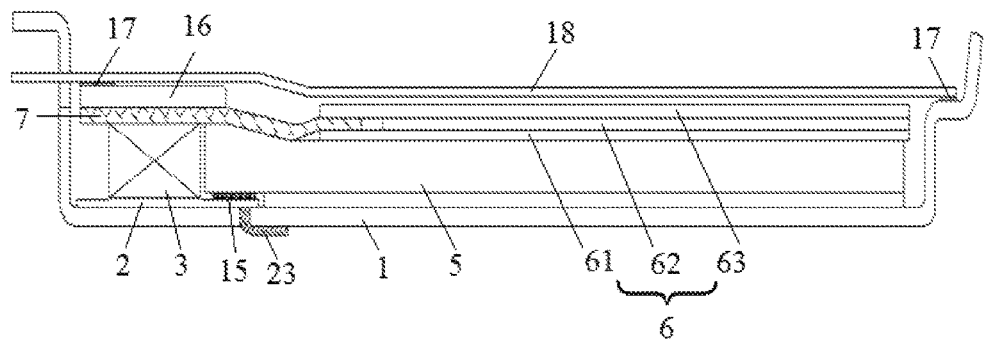
FIG. 4 is a schematic structural view a backlight module according to an exemplary arrangement of the present disclosure.

The present disclosure firstly provides a backlight module. FIG. 4 is a schematic structural view a backlight module according to an exemplary arrangement of the present disclosure. The backlight module may include a back plate 1, a circuit layer 2, a light source 3, and a plurality of connecting leads 23 and so on. The back plate has a first surface and a second surface disposed opposite to each other. The back plate is provided with a plurality of through holes penetrating the first surface and the second surface. The circuit layer 2 may be disposed on the first surface to form a driving circuit of the light source 3. The light source 3 is disposed on a side of the circuit layer 2 away from the back plate 1 and formed integrally with the back plate 1. The plurality of connecting leads pass through the plurality of through holes one-to-one for connecting the circuit layer and a main circuit board.

In the backlight module of the present disclosure, a circuit layer is disposed on a side of the back plate, and the circuit layer forms a driving circuit of the light source; the light source is disposed on a side of the circuit layer away from the back plate, and the light source and the back plate are integrally formed. On one hand, the light source and the back plate are integrally disposed, and the light source does not fall off due to the glue failure, thus avoiding the separation of the LED strip and the light guide plate (the separation may result in the hot spot) due to the low adhesive strength between the LED strip and the light guide plate in the prior art. On the other hand, there is no design of the frame, there is no lapping width (i.e., the lapping width), which is conducive to the design of the narrow bezel.

In the present exemplary arrangement, before or after the back plate 1 is formed, an insulating layer may be disposed on the surface of the back plate 1, and the insulating layer serves to insulate the circuit layer 2 from the back plate 1. The insulating layer may form a ceramic film, a carbide film or a polymer film layer on the surface of the back plate 1 by thermal spraying; or may form an electrical insulating film on the surface of the back plate 1 by physical vapor deposition (PVD); or a phosphate film is formed on the surface of the back plate 1 by phosphating of stainless steel, and the phosphate film is a high-resistance film layer, which has excellent electrical insulation. Of course, there are other methods, which will not be described herein. The thickness of the insulating layer formed on the surface of the back plate 1 may be less than 10 μm.

Then, the circuit layer 2 is formed on the insulating layer by using printed electronic technology. The printed electronic technology is simpler in process, lower in cost and lower in pollution than the conventional etching forming technology. The circuit layer 2 is made of a conductive silver paste or an ink having a conductive function. This circuit layer 2 is the driving circuit of the light source 3.

Figure 5:
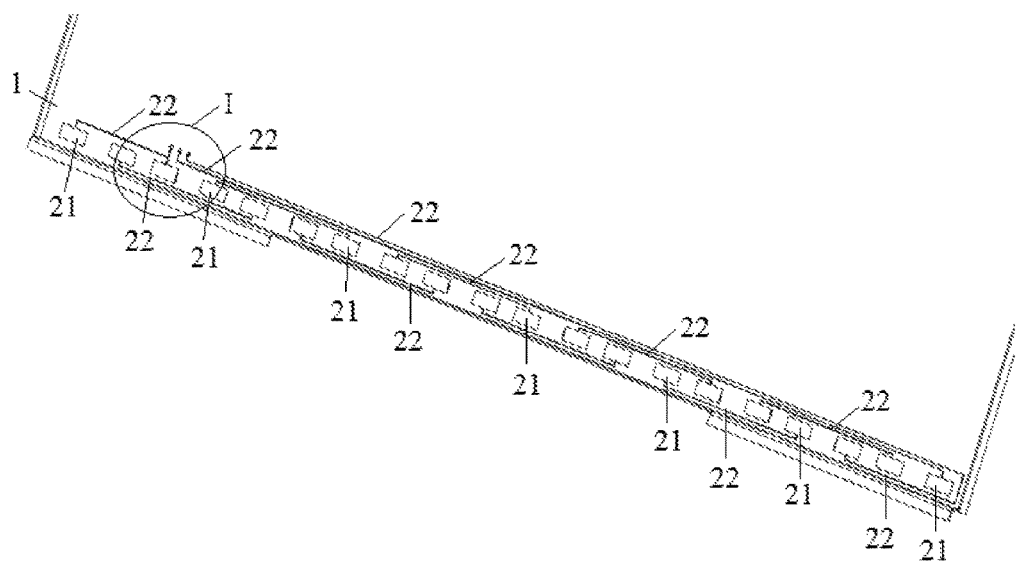
FIG. 5 is a schematic structural view of the circuit layer in FIG. 4.
Figure 6:
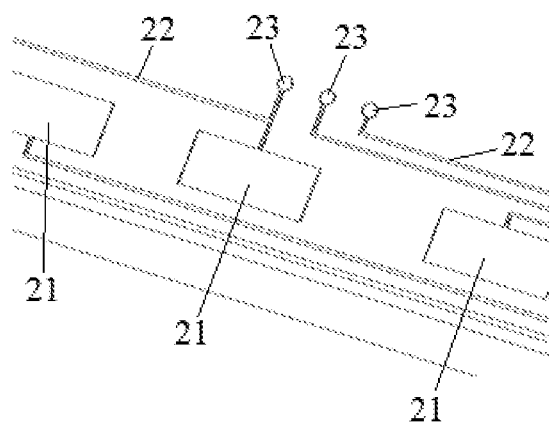
FIG. 6 is a partial enlarged view of the portion indicated by I in FIG. 5.
Figure 7:
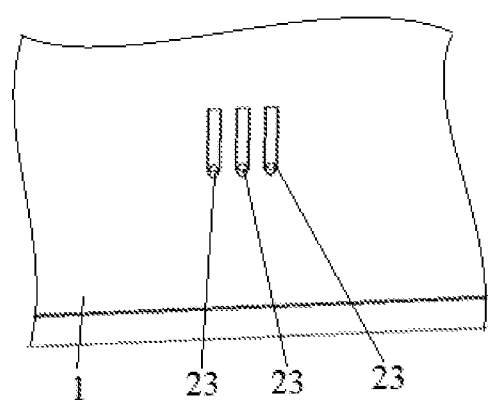
FIG. 7 is a schematic view showing the structure of the circuit layer leading to the back of the back plate.

FIG. 5 is a schematic structural view of the circuit layer 2 in FIG. 4. FIG. 6 is a partial enlarged view of the portion indicated by I in FIG. 5. FIG. 7 is a schematic view showing the structure of the circuit layer 2 leading to the back of the back plate 1. The circuit layer 2 may include a plurality of light source pads 21 and a plurality of leads 22 connected to the light source pads 21. A plurality of through holes are formed in the back plate 1, and the plurality of leads 22 are correspondingly connected to the plurality of through holes. The plurality of connecting leads 23 correspondingly pass through the plurality of through holes, and the plurality of connecting leads 23 connect the plurality of leads 22 to the back side of the back plate 1, thus connecting the circuit layer 2 to the main circuit board 19, so that the main circuit board 19 can control the circuit layer 2.

In the present exemplary arrangement, the plurality of through holes may be formed by laser or by photolithography. The plurality of connecting leads 23 may be simultaneously formed when the circuit layer 2 is formed.

Figure 8:
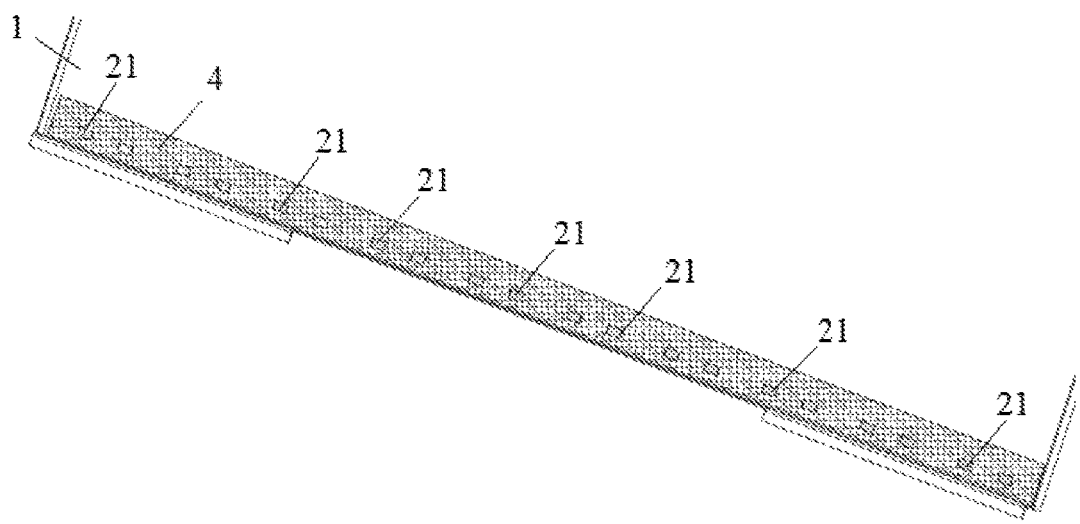
FIG. 8 is a schematic view showing coating a protection layer on the circuit layer.

FIG. 8 is a schematic view showing coating a protection layer 4 on the circuit layer 2. In order to protect the circuit layer 2, a protection layer 4 may be provided on the circuit layer 2. The protection layer 4 covers all the circuit layers 2 except the light source pads 21. The protection layer 4 may be a printed insulating ink or a coated fluorinated liquid or a polyimide film (abbreviated as PI film).

Figure 9:
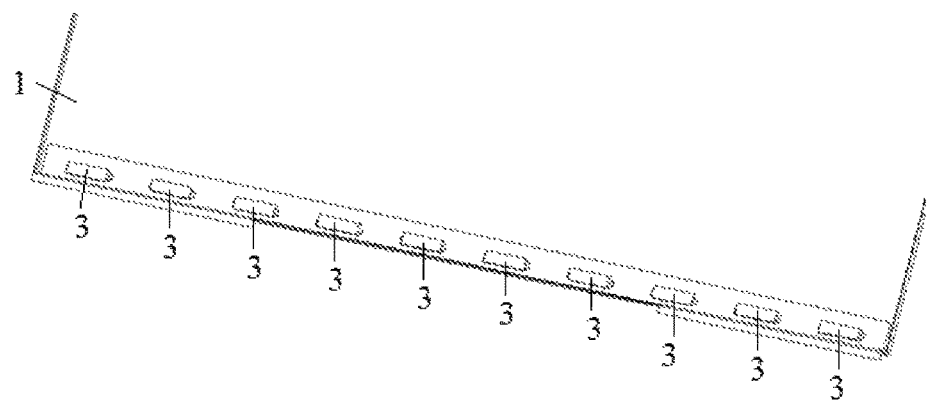
FIG. 9 is a schematic structural view after the light source is mounted on the back plate.

FIG. 9 is a schematic structural view after the light source 3 is mounted on the back plate 1. In the present exemplary arrangement, the light source 3 is disposed on a side of the circuit layer 2 away from the back plate 1 and formed integrally with the back plate 1, that is, the light source 3 may be disposed on the circuit layer 2. Specifically, the light source 3 is disposed on the light source pad 21. The light source 3 is mounted on the circuit layer 2 by surface mount technology (SMT). The surface mount technology has high assembly density, small electronic product size, light weight, high reliability, and strong vibration resistance. Therefore, the light source 3 and the back plate 1 which are mounted by the surface mount technology can be integrally formed, which can be adapted to the single cell reliability test and the light source 3 will not fall off.

The backlight module may further include a light guide plate 5, and the light guide plate 5 may be adhered to the back plate 1 through a double-sided tape 15 and located on the light exit side of the light source 3. In the present exemplary arrangement, the light guide plate 5 may be adhered to the protection layer 4.

The backlight module may further include a backlight film 6 and a light shielding tape 7. The backlight film 6 may be disposed on a side of the light guide plate 5 away from the back plate 1. The light shielding tape 7 may be used to fix the backlight film 6 on a side where the light source 3 is disposed. In the present exemplary arrangement, the backlight film 6 may include a diffusion sheet 61, a lower prism sheet 62, an upper prism sheet 63, and the like. The diffusion sheet 61 may be disposed on a side of the light guide plate 5 away from the back plate 1. The lower prism sheet 62 may be disposed on a side of the diffusion sheet 61 away from the back plate 1. The upper prism sheet 63 may be disposed on a side of the lower prism sheet 62 away from the back plate 1. That is, the diffusion sheet 61, the lower prism sheet 62, and the upper prism sheet 63 are provided in order from the bottom to the top.

On the side where the light source 3 is disposed, the diffusion sheet 61, the lower prism sheet 62, and the upper prism sheet 63 are both fixed to the light source 3 and the light guide plate 5 by the light shielding tape 7. The specific way of fixing them is explained below.

The light guide plate 5 may protrude toward the light source 3 from the diffusion sheet 61. One end of the light shielding tape 7 is adhered to a side of the light source 3 away from the back plate 1. The middle portion of the light shielding tape 7 is adhered to a side of the light guide plate 5 which is away from the back plate 1 and close to the light source 3. The other end of the light shielding tape 7 is adhered to a side of the diffusion sheet 61 which is away from the back plate 1 and is close to one end of the light source 3. Therefore, the light source 3, the light guide plate 5, and the diffusion sheet 61 are fixed by the light shielding tape 7.

Figure 10:
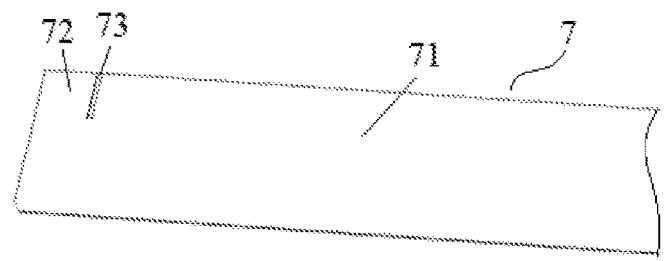
FIG. 10 is a schematic structural view of a light shielding tape.

FIG. 10 shows the structural schematic view of the light shielding tape 7. The light shielding tape 7 may include a tape body 71 which is provided in an elongated shape, and two connection tapes 72 are provided at both ends in the longitudinal direction of the tape body 71, that is, one connection tape 72 is provided at one end. The connection tape 72 is integrated with the tape body 71 on the side close to the light source 3, and a gap 73 is provided between the connection tape 72 and the tape body 71 on the side away from the light source 3. The length of the connection tape 72 may be the same as the width of the tape body 71.

Figure 11:
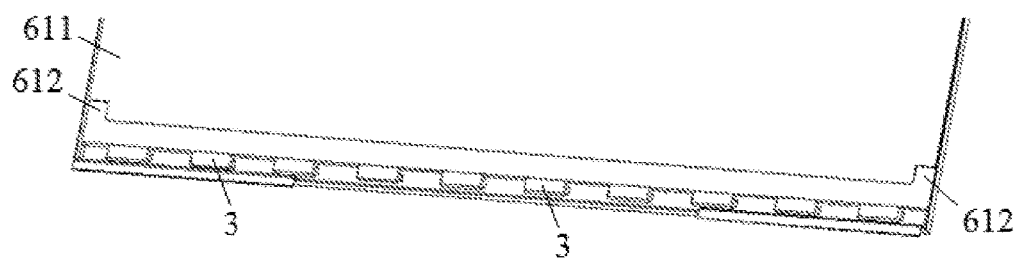
FIG. 11 is a schematic view showing the structure of a diffusion sheet and the structure after installation.

FIG. 11 is a schematic view showing the structure of a diffusion sheet and the structure after installation. The diffusion sheet 61 may include a first sheet body 611 and a notch 612 provided in the first sheet body 611. There may be two notches 612, which are disposed on the side of the first sheet body 611 close to the light source 3, and are located at the corners of the first sheet body 611. That is, the diffusion sheet 61 has a convex portion. The width of the notch 612 may be substantially the same as the width of the connection tape 72 or greater than the width of the connection tape 72. Additionally, in other example arrangements of the present disclosure, the number of notches 612 may be one, three or more.

Figure 12:
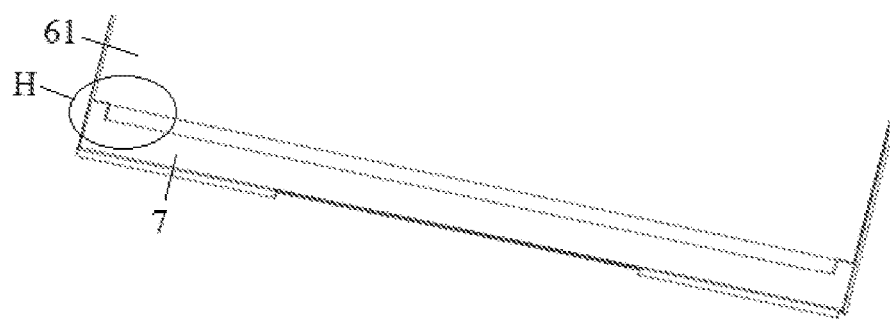
FIG. 12 is a schematic structural view of the light shielding tape after installation.
Figure 13:
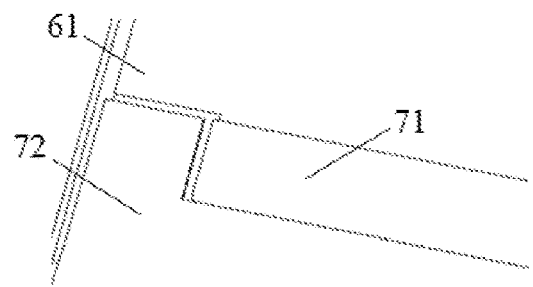
FIG. 13 is a partially enlarged schematic view showing a portion indicated by H in FIG. 12.

FIG. 12 is a schematic structural view of the light shielding tape after installation, FIG. 13 is a partially enlarged schematic view showing a portion indicated by H in FIG. 12. The lower surface of the tape body 71 (i.e., the central portion of the light shielding tape 7) is adhered to the diffusion sheet 61 located thereunder, and the lower surface of the connection tape 72 is bonded to the light guide plate 5. The thickness of the connection tape 72 of the light shielding tape 7 is greater than or equal to the thickness of the diffusion sheet 61. After the diffusion sheet 61 is adhered, the upper surface of the connection tape 72 can be higher than the upper surface of the diffusion sheet 61, thus facilitating the adhesive of the subsequent lower prism sheet 62.

Figure 14:
FIG. 14 is a schematic view showing the structure of a lower prism sheet and the structure after installation.
Figure 15:
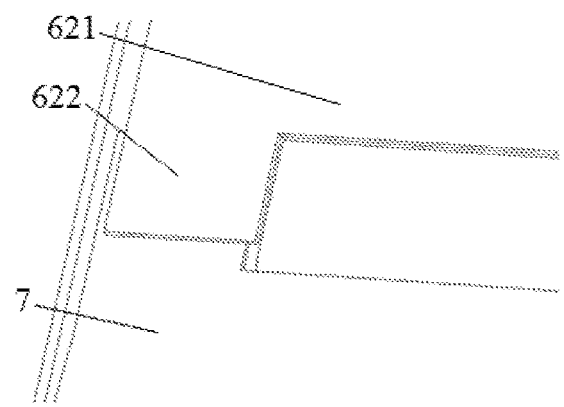
FIG. 15 is a partially enlarged view of the portion indicated by T in FIG. 14.

FIG. 14 is a schematic view showing the structure of a lower prism sheet and the structure after installation. FIG. 15 is a partially enlarged view of the portion indicated by T in FIG. 14. The lower prism sheet 62 is adhered to a side of the light shielding tape 7 away from the back plate 1. The lower prism sheet 62 may include a second sheet body 621 and two lugs 622. The lugs 622 are disposed at a side of the second sheet body 621 close to the light source 3 and are located at the corner of the second sheet body 621. That is, the lower prism sheet 62 has a concave portion. The lugs 622 engage with the notches 612 of the diffusion sheet 61. After the lower prism sheet 62 is mounted, the lugs 622 are adhered to the upper surface of the connection tape 72 of the light shielding tape 7, and since the lower prism sheet 62 has a shape like a "concave" shape, the upper surface of the tape body 71 is exposed. The thickness of the tape body 71 of the light shielding tape 7 is greater than or equal to the thickness of the lower prism sheet 62. After the lower prism sheet 62 is adhered, the upper surface of the tape body 71 can be higher than the upper surface of the lower prism sheet 62, thus facilitating adhesive of the subsequent upper prism sheet 63. Additionally, in other example arrangements of the present disclosure, the number of lugs 622 may be one, three or more; the number and position of the lugs 622 correspond to the number and location of the notches 612. Of course, the structure of the light shielding tape 7 needs to be changed at this time, and the light shielding tape 7 is disposed in a plurality of sections. A gap is required at a position where the lugs 622 and the notches 612 engage with each other to facilitate the bending of the light shielding tape 7.

Figure 16:
FIG. 16 is a schematic view showing the structure of a lower prism sheet and the structure after installation.
Figure 17:
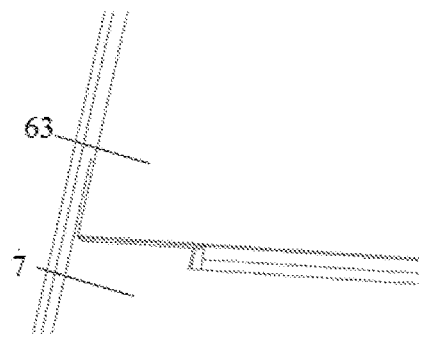
FIG. 17 is a partially enlarged schematic view showing a portion indicated by X in FIG. 16.

FIG. 16 is a schematic view showing the structure of a lower prism sheet and the structure after installation. FIG. 17 is a partially enlarged schematic view showing a portion indicated by X in FIG. 16. The upper prism sheet 63 may be designed as a rectangular shape. The upper prism sheet 63 is adhered to a position where the light shielding tape 7 is not adhered to the lower prism sheet 62, for example, the upper prism sheet 63 is adhered to the upper surface of the tape body 71 of the light shielding tape 7.

The design of the light shielding tape 7 does not occupy the stack thickness of the backlight module, which is advantageous for achieving a thin the backlight module. Moreover, the circuit board 13 and the light shielding tape for adhering the circuit board 13 are eliminated as compared with the prior art, which further facilitates the thinness of the backlight module.

A weak adhesive tape 17 is provided on a side of the incoming backlight module where the light source 3 is provided and on a side of the incoming backlight module which is opposite to the side where the light source 3 is provided. A protection film 18 is adhered to the weak adhesive tape 17, and the protection film 18 can protect the backlight module to prevent displacement of the backlight film 6 on the side which is opposite to the side where the light source 3 when the material is fed. In the subsequent assembly process, the weak adhesive tape 17 and the protection film 18 can be removed.

The present disclosure also provides a display device, which may include a cover 8, a display panel 9, and the backlight module described above and the like. The specific structure of the backlight module has been described in detail above, and will not be described herein.

In the present exemplary arrangement, the back plate 1 may include a back plate body 105 and a first bending structure 101 disposed perpendicularly to the back plate body 105, and the first bending structure 101 is bent toward the side where the light source 3 and the light guide plate 5 are mounted.

Figure 18:
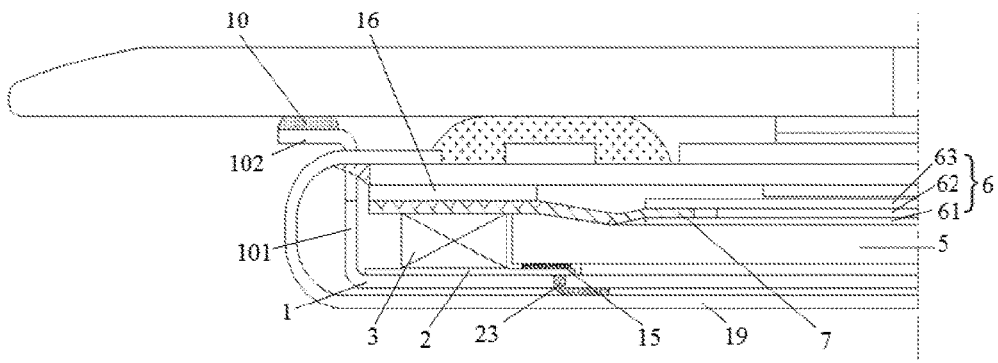
FIG. 18 is a schematic structural view of a side of a display device on which a light source is disposed.
Figure 19:
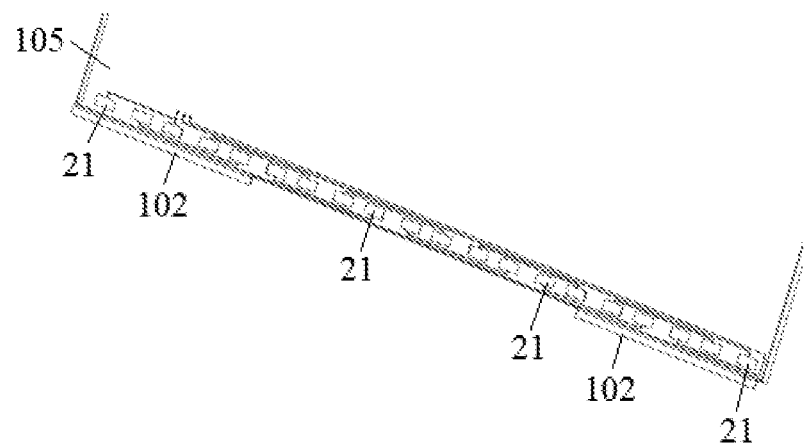
FIG. 19 is a schematic structural view of a second bending structure.

FIG. 18 is a schematic structural view of a side of a display device on which a light source 3 is disposed. On the side where the light source 3 is disposed, the back plate 1 further includes a second bending structure 102 connected to the first bending structure 101 and extending in a direction which is the same as that of the back plate body 105. In the present exemplary arrangement, the second bending structure 102 extends toward a side away from the center of the back plate 1, so that the back plate 1 forms an open structure. Of course, the second bending structure 102 may also extend toward a side close to the center of the back plate 1 so that the back plate 1 forms a closing structure. FIG. 19 is a schematic structural view of the second bending structure 102. The second bending structure 102 can be formed as two intermittent segments. Of course, it can also be designed as three or more segments or as a continuous segment. A first adhesive portion 10 is disposed on the upper surface of the second bending structure 102, and the first adhesive portion 10 can be used to adhere the second bending structure 102 and the cover plate 8. The first adhesive portion 10 may be a hot melt adhesive. A foam 16 is disposed on the light shielding tape 7, and the foam 16 can be used to adhere the display panel and the light shielding tape 7 to fix the backlight module and the display panel 9.

Figure 20:
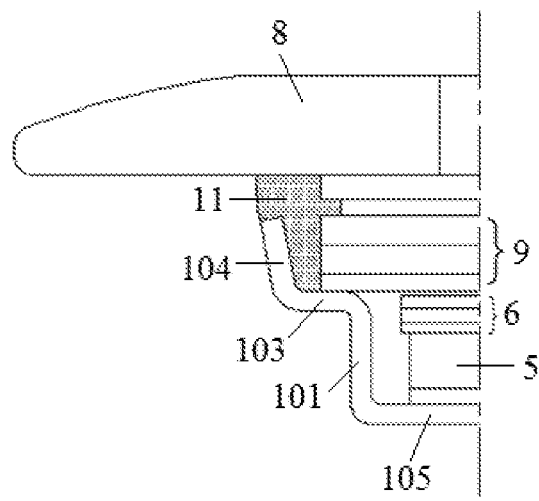
FIG. 20 is a schematic view of a side of a display device which is opposite to the side on which a light source is disposed.

FIG. 20 is a schematic view of a side of a display device which is opposite to the side on which a light source is disposed. On the opposite side of the light source 3, the back plate 1 may further include a third bending structure 103. The third bending structure 103 is connected to the first bending structure 101 and extends in a direction that is the same as that of the back plate body 105, and the display panel 9 is lapped on the third bending structure 103 (in other words, the display panel 9 is overlapped on the third bending structure 103, or the display panel 9 lies on the third bending structure 103). In the present exemplary arrangement, the third bending structure 103 extends toward a side away from the center of the back plate 1, so that the back plate 1 forms an open structure. The display panel 9 is lapped on the upper surface of the third bending structure 103. Of course, the third bending structure 103 may alternatively extend toward the side close to the center of the back plate 1, so that the back plate 1 forms a closing structure there. Also, the display surface may be lapped on the upper surface of the third bent structure 103.

Figure 21:
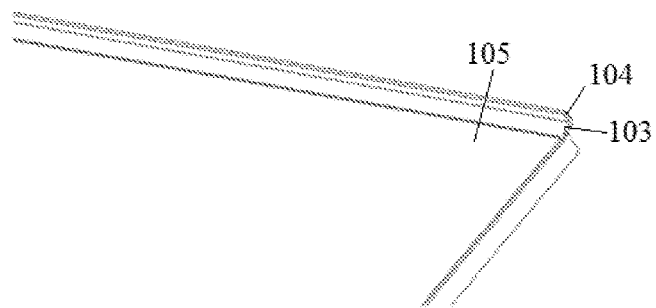
FIG. 21 is a schematic structural view of a third bending structure and a fourth bending structure.
Figure 22:
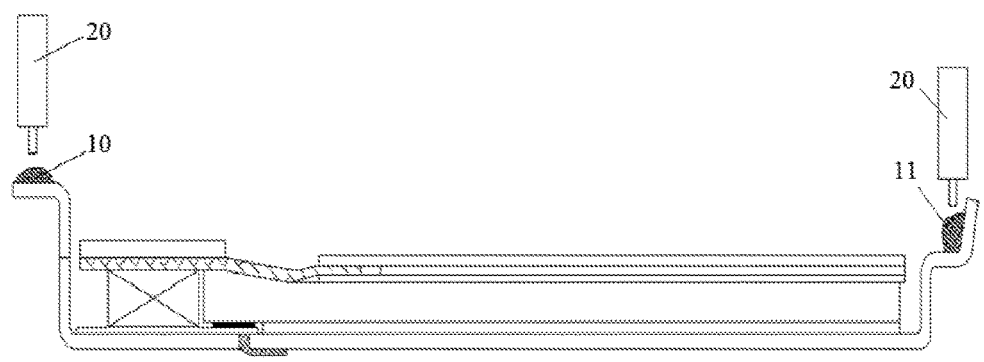
FIG. 22 is a schematic view of a dispensing process for a backlight module.

FIG. 21 is a schematic structural view of the third bending structure 104 and a fourth bending structure 104. The back plate 1 may further include a fourth bending structure 104 connected to the third bending structure 103 and forming a preset angle with respect to the third bending structure 103. In the present exemplary arrangement, the third bending structure 103 extends toward a side away from the center of the back plate 1, so that the back plate 1 forms an open structure. The fourth bending structure 104 extends toward the side of the cover plate 8, and the angle between the fourth bending structure 104 and the third bending structure 103 is greater than 90 degrees, that is, the fourth bending structure 104 is inclined toward the side which is away from the center of the back plate 1, so that more hot melt adhesive can be accommodated between the fourth bending structure 104 and the display panel 9 to ensure the adhesive strength. FIG. 22 is a schematic view of a dispensing process for a backlight module. The hot melt adhesive is applied to the joint of the third bending structure 103 and the fourth bending structure 104 by the glue gun 20, and then the display panel 9 is mounted to so that the display panel 9 is overlapped on the upper surface of the third bending structure 103. The display panel 9 presses the hot melt adhesive so that the hot melt adhesive protrudes from the gap between the panel 9 and the fourth bending structure 104, and then the cover plate 8 is installed. The cover plate 8 is in contact with the hot melt adhesive which protrudes from the display panel 9 and the fourth bending structure 104. After the hot melt adhesive is cooled, a second adhesive portion 11 is formed, and the second adhesive portion 11 can be used to adhere the third bending structure 103, the fourth bending structure 104, the display panel 9, and the cover plate 8.

After the hot melt adhesive is applied and the components are installed in place, pressure needs to be maintained at the position of the hot melt adhesive during the pre-sintering time, and the assembly of each adhered member is calibrated to ensure the accuracy of installation of each component.

Figure 23:
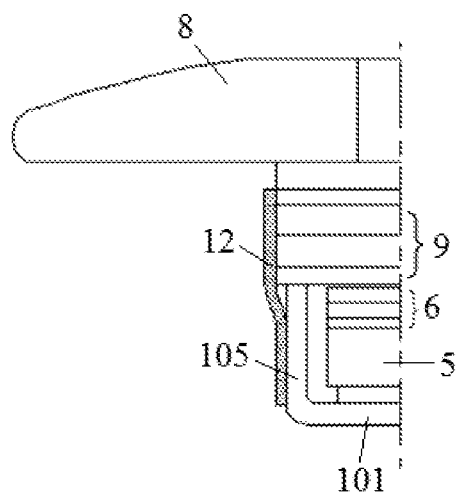
FIG. 23 is a schematic structural view of the left side or the right side of the display device.

FIG. 23 is a schematic structural view of the left side or the right side of the display device. The light shielding adhesive layer 12 is disposed on the sides of the backlight module except the side where the light source 3 is provided and the side opposite to the side where the light source 3 provided, that is, light shielding adhesive layer 12 is disposed on the left and right sides of the backlight module. The light shielding adhesive layer 12 may be made of a light shielding tape, a black tape, or the like. The light shielding adhesive layer 12 is used to adhere the first bending structure 101 and the display panel 9, and the light shielding adhesive layer 12 is adhered to the outer side surface of the first bending structure 101 and the outer side surface of the display panel 9 away from the center. Since the back plate 1 and the display panel 9 are bonded by hot melt adhesive on the side where the light source 3 is disposed and the side opposite to the side where the light source 3 is disposed, the adhesion between the back plate 1 and the display panel 9 can be ensured, and therefore no adhesive or glue is applied on the left and right sides. In this way, the manufacturing processes is reduced to lower costs and improve efficiency. Further, the bezel is narrowed to achieve the narrow bezel design goal.

The features, structures, or characteristics described above may be combined in any suitable manner in one or more arrangements, and the features discussed in the various arrangements are interchangeable, if possible. In the descriptions above, numerous specific details are set forth to provide a full and complete understanding of the present disclosure. However, one skilled in the art will appreciate that the technical solutions of the present disclosure may be practiced without one or more of the specific details, or other methods, components, materials, and the like may be employed. In other instances, well-known structures, materials or operations are not shown or described in detail to avoid obscuring aspects of the present disclosure.

Although the relative terms such as "upper" and "lower" are used in the specification to describe the relative relationship of one component to another component, these terms are used in this specification for convenience only. For example, the relative terms are based on the directions as shown in the accompanying drawings. It will be understood that if the device as shown in a drawing is flipped upside down, the components described as "above" or "upper" will become the component "below" or "lower". When a structure is "on" another structure, it is possible that the structure is integrally formed on another structure, or that the structure is "directly" disposed on another structure, or that the structure is "indirectly" disposed on another structure through other structures.

In the present specification, the terms "a", "an", "the" and "said" are used to mean the presence of one or more elements/components, etc.; the terms "comprising" "including" represents the meaning of openness and means that there may be additional elements/components and so on in addition to the listed elements/components. The terms "first", "second" and "third" are used to distinguish elements and are not used to limit the number of the elements.

It should be understood that the present disclosure is not limited to the detailed structures and arrangements as described herein. The present disclosure can be implemented in various forms. The variations and modifications are within the scope of the present disclosure. It is to be understood that the present disclosure disclosed and claimed herein extends to all alternative combinations of two or more individual features that are mentioned or apparent in the drawings. All of these different combinations constitute a number of alternative aspects of the present disclosure. The arrangements described in the specification are illustrative of the best mode for carrying out the present disclosure and will enable those skilled in the art to utilize the present disclosure.

What is claimed is:

1. A backlight module, comprising:
    a back plate having a first surface and a second surface which are opposite to each other, wherein the back plate is provided with a plurality of through holes penetrating the first surface and the second surface;
    a circuit layer disposed on the first surface to form a driving circuit for a light source;
    the light source disposed on a surface of the circuit layer away from the back plate and formed integrally with the back plate; and
    a plurality of connecting leads passing through the plurality of through holes one-to-one for connecting the circuit layer and a main circuit board.

2. The backlight module of claim 1, wherein the backlight module further comprises:
    a light guide plate adhered to the back plate and located on a light exit side of the light source;
    a backlight film disposed on a side of the light guide plate away from the back plate;
    a light shielding tape for fixing the backlight film on a side where the light source is disposed;
    wherein the backlight film comprises:
    a diffusion sheet disposed on a side of the light guide plate away from the back plate;
    a lower prism sheet disposed on a side of the diffusion sheet away from the back plate; and
    an upper prism sheet disposed on a side of the lower prism sheet away from the back plate.

3. The backlight module according to claim 2, wherein on a side where the light source is disposed, the light guide plate protrudes from the diffusion sheet, and the light shielding tape is adhered to a side of the light guide plate away from the back plate and a side of the diffusion sheet away from the back plate.

4. The backlight module of claim 3, wherein the diffusion sheet comprises:
    a first sheet adhered to the light shielding tape; and
    a notch provided on a side of the first sheet close to the light source.

5. The backlight module according to claim 4, wherein the lower prism sheet is adhered to a side of the light shielding tape away from the back plate, and the lower prism sheet comprises:
    a second sheet; and
    a lug disposed on a side of the second sheet close to the light source and engaging with the notch, the lug being adhered to the light shielding tape;
    wherein the upper prism sheet is adhered to a position where the light shielding tape is not adhered to the lower prism sheet.

6. A display device, comprising:
    a display panel;
    a cover plate disposed on a side of the display panel;
    a backlight module disposed on a side of the display panel away from the cover plate;
    wherein a back plate comprises:
    a back plate body; and
    a first bending structure connected to the back plate body;
    wherein the backlight module comprises:

a back plate having a first surface and a second surface which are opposite to each other, wherein the back plate is provided with a plurality of through holes penetrating the first surface and the second surface;

a circuit layer disposed on the first surface to form a driving circuit for a light source;

the light source disposed on a surface of the circuit layer away from the back plate and formed integrally with the back plate; and a plurality of connecting leads passing through the plurality of through holes one-to-one for connecting the circuit layer and a main circuit board.

7. The display device according to claim 6, wherein on a side where the light source is disposed, the back plate further comprises a second bending structure connected to the first bending structure and extending in a direction which is the same as that of the back plate body;

and wherein the display device further comprises:

a first adhesive portion for adhering the second bending structure and the cover plate.

8. The display device according to claim 6, wherein on a side opposite to a side where the light source is disposed, the back plate further comprises:

a third bending structure connected to the first bending structure and extending in a direction that is the same as that of the back plate body;

and wherein the display panel is lapped over the third bending structure.

9. The display device of claim 8, wherein the back plate further comprises a fourth bending structure connected to the third bending structure and forming a preset angle with respect to the third bending structure;

and wherein the display device further comprises:

a second adhesive portion for adhering the third bending structure, the fourth bending structure, the display panel, and the cover plate.

10. The display device according to claim 6, wherein except the side on which the light source is disposed and the opposite side of the light source, the display device further comprises:

a light shielding adhesive layer for adhering the first bending structure and the display panel.

11. The display device according to claim 6, wherein the backlight module further comprises:

a light guide plate adhered to the back plate and located on a light exit side of the light source;

a backlight film disposed on a side of the light guide plate away from the back plate;

a light shielding tape for fixing the backlight film on a side where the light source is disposed;

and wherein the backlight film comprises:

a diffusion sheet disposed on a side of the light guide plate away from the back plate;

a lower prism sheet disposed on a side of the diffusion sheet away from the back plate; and an upper prism sheet disposed on a side of the lower prism sheet away from the back plate.

12. The display device according to claim 11, wherein on a side where the light source is disposed, the light guide plate protrudes from the diffusion sheet, and the light shielding tape is adhered to a side of the light guide plate away from the back plate and a side of the diffusion sheet away from the back plate.

13. The display device according to claim 12, wherein the diffusion sheet comprises:

a first sheet adhered to the light shielding tape; and a notch provided on a side of the first sheet close to the light source.

14. The display device according to claim 13, wherein the lower prism sheet is adhered to a side of the light shielding tape away from the back plate, and the lower prism sheet comprises:

a second sheet; and a lug disposed on a side of the second sheet close to the light source and engaging with the notch, the lug being adhered to the light shielding tape;

and wherein the upper prism sheet is adhered to a position where the light shielding tape is not adhered to the lower prism sheet.

* * * * *